（12） United States Patent
Akiyama et al.

(10) Patent No.: US 9,921,938 B2
(45) Date of Patent: Mar. 20, 2018

(54) ANOMALY DETECTION SYSTEM, ANOMALY DETECTION METHOD, AND PROGRAM FOR THE SAME

(71) Applicant: International Business Machines Corporation, Armonk, NY (US)

(72) Inventors: Kazuhito Akiyama, Tokyo (JP); Michiharu Kudo, Kamakura (JP); Takuya Mishina, Sagamihara (JP); John D. Wilson, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 785 days.

(21) Appl. No.: 14/483,221

(22) Filed: Sep. 11, 2014

(65) Prior Publication Data

US 2015/0033076 A1    Jan. 29, 2015

Related U.S. Application Data

(63) Continuation of application No. 13/988,485, filed as application No. PCT/JP2012/051668 on Jan. 26, 2012, now Pat. No. 9,529,690.

(30) Foreign Application Priority Data

Mar. 28, 2011   (JP) ................................. 2011-070278

(51) Int. Cl.
*G06F 11/34*   (2006.01)
*G06F 21/55*   (2013.01)
(Continued)

(52) U.S. Cl.
CPC .......... *G06F 11/3466* (2013.01); *G05B 11/01* (2013.01); *G05B 23/027* (2013.01);
(Continued)

(58) Field of Classification Search
CPC .. G06F 11/3466; G06F 21/554; G06F 3/1229; G06F 3/1273; G06F 3/1288;
(Continued)

(56) References Cited

U.S. PATENT DOCUMENTS

| 2005/0131583 | A1* | 6/2005 | Ransom ................. H04L 63/08 700/295 |
| 2009/0222687 | A1* | 9/2009 | Baker ................. H04L 41/0681 714/4.11 |
| 2011/0060427 | A1* | 3/2011 | Batke ................. G05B 23/0267 700/79 |

FOREIGN PATENT DOCUMENTS

| CN | 1573709 A | 2/2005 |
| CN | 101170455 A | 4/2008 |

(Continued)

OTHER PUBLICATIONS

Invensys Systems, "Wonderware Factory Suite: IndustrialSQL Server Historian Concepts Guide", Jul. 13, 2005, Revision E p. 57-58.*

(Continued)

*Primary Examiner* — Kenneth M Lo
*Assistant Examiner* — Alan Chu
(74) *Attorney, Agent, or Firm* — David Zwick

(57) ABSTRACT

A method is for handling an anomaly in an industrial control system (ICS) connected to a network with a plurality of other ICSs and an anomaly analyzer. An ICS receives status data from its own industrial process, and stores this status data as normal pattern data. The ICS transmits its own status data to one or more other ICSs. The ICS receives an indication from the anomaly analyzer that the ICS is suspected of having an anomaly. The ICS transmits alternate status data based on the normal pattern data stored during non-suspect operation, and stores the status data received from its own industrial process as real status data. In (Continued)

response to receiving from the anomaly analyzer an indication that the ICS is not operating anomalously, the ICS transmits the stored real data, and switches back to transmitting its own status data to one or more other ICSs.

4 Claims, 17 Drawing Sheets

(51) Int. Cl.
    *G05B 11/01*     (2006.01)
    *H04L 29/06*     (2006.01)
    *G05B 23/02*     (2006.01)
    *G06F 3/12*     (2006.01)
    *H04N 1/00*     (2006.01)

(52) U.S. Cl.
    CPC ....... *G05B 23/0262* (2013.01); *G06F 21/554* (2013.01); *H04L 63/1425* (2013.01); *G06F 3/121* (2013.01); *G06F 3/1229* (2013.01); *G06F 3/1273* (2013.01); *G06F 3/1288* (2013.01); *H04N 1/00127* (2013.01)

(58) Field of Classification Search
    CPC ... G06F 3/121; G05B 23/027; G05B 23/0262; G05B 11/01; H04L 63/1425; H04N 1/00127
    USPC .......................................................... 700/79
    See application file for complete search history.

(56) References Cited

FOREIGN PATENT DOCUMENTS

| | | |
|---|---|---|
| CN | 103443727 A | 12/2013 |
| DE | 60100962 T2 | 7/2004 |
| DE | 112012000772 T5 | 11/2013 |
| EP | 2287692 A2 | 2/2011 |
| GB | 2505340 A | 2/2014 |
| JP | 10313537 A | 11/1998 |
| JP | 11096031 A | 4/1999 |
| JP | 11175103 A | 7/1999 |
| JP | 2000214919 A | 8/2000 |
| JP | 2004054706 A | 2/2004 |
| JP | 2004086880 A | 3/2004 |
| JP | 2004246438 A | 9/2004 |
| JP | 2005227982 A | 8/2005 |
| JP | 2006202293 A | 8/2006 |
| JP | 4052983 B2 | 2/2008 |
| JP | 2011035664 A | 2/2011 |
| JP | 5480447 B2 | 4/2014 |
| KR | 1020130124357 A | 11/2013 |
| WO | 2006022161 A1 | 3/2006 |
| WO | 2012132527 A1 | 10/2012 |

OTHER PUBLICATIONS

China Patent & Trademark Office, Office Action for Application No. 201280015056.3, dated Mar. 30, 2015, pp. 1-5.
Japanese Patent Office, "International Search Report," Feb. 21, 2012, International Application No. PCT/JP2012/051668.
Akiyama et al., "Anomaly Detection System, Anomaly Detection Method, and Program for the Same," Filed May 20, 2013, p. 1-39, U.S. Appl. No. 13/988,485.
The International Bureau, "Notification Concerning Transmittal of International Preliminary Report on Patentability," Oct. 10, 2013, International Application No. PCT/JP2012/051668.
Deutsches Patent und Markenamt, "Zitierte Druckschriften und Prüfungsbescheid," German Cited References and Office Action, dated May 22, 2014, International Application No. 11 2012 000 772.7.

\* cited by examiner

EVENT DATA

| EVENT ID | DEVICE ID | DATE AND TIME | EVENT TYPE | EVENT DETAIL 1 | EVENT DETAIL 2 | EVENT DETAIL 3 |
|---|---|---|---|---|---|---|
| 1000 | MFP0001 | 2010/10/01 09:00:21 | PAPER JAM | JAM OCCURRENCE | : | : |
| 1001 | MFP0001 | 2010/10/01 09:05:40 | PAPER JAM | JAM RECOVERY | : | : |
| 1002 | MFP0002 | 2010/10/02 13:12:33 | MAINTENANCE CALL | FAULT OCCURRENCE | LEVEL A | CODE233 |
| 1003 | MFP0002 | 2010/10/03 06:00:51 | MAINTENANCE CALL | FAULT RECOVERY | LEVEL A | CODE233 |
| 1004 | MFP0003 | 2010/10/04 11:34:02 | TONER INFORMATION | TONER Low | BLACK | 15% REMAINING |
| 1005 | MFP0004 | : | COVER INFORMATION | COVER OPEN | TOP | : |
| 1006 | MFP0001 | : | POWER MODE | FROM FULL POWER | CHANGE TO LOW POWER | : |
| 1007 | MFP0002 | : | : | : | : | : |

LOG DATA(Measured)

| LOG ID | DEVICE ID | DATE AND TIME | LOG TYPE | LOG DETAIL 1 | LOG DETAIL 2 | LOG DETAIL 3 | LOG DETAIL 4 |
|---|---|---|---|---|---|---|---|
| 2000 | MFP0001 | : | PRINT JOB | User A | 3 PAGES | COLOR PRINT | DOUBLE SIDED PRINT |
| 2001 | MFP0001 | : | PRINT JOB | User B | 5 PAGES | MONOCHROME PRINT | SINGLE SIDED PRINT |
| 2002 | MFP0002 | : | PRINT JOB | User C | 10 PAGES | COLOR PRINT | SINGLE SIDED PRINT |
| 2003 | MFP0002 | : | LOGON FAILURE | User X | RETRY THREE TIMES | : | : |
| 2004 | MFP0003 | : | INVENTORY | TONER USAGE | 10%/Day | BLACK | : |
| 2005 | MFP0003 | : | INVENTORY | POWER MODE | FULL POWER | 3 HOURS/Day | : |
| 2006 | MFP0004 | : | INVENTORY | POWER USAGE | 753 Kwh/Day | : | : |
| 2007 | MFP0002 | | : | : | : | : | : |

*FIG. 5*

CONTROL COMMAND

| COMMAND ID | DEVICE ID | DATE AND TIME | COMMAND TYPE | COMMAND DETAIL 1 | COMMAND DETAIL 2 | COMMAND DETAIL 3 | |
|---|---|---|---|---|---|---|---|
| 3000 | MFP0001 | : | LOG ACQUISITION REQUEST | HDD CAPACITY 95% | : | : | |
| 3001 | MFP0001 | : | POLICY UPDATE REQUEST | PRINT POLICY | : | : | |
| 3002 | MFP0001 | : | TONER ORDER REQUEST | BLACK | 10% REMAINING | : | |
| 3003 | MFP0001 | : | PAPER REFILL REQUEST | A4 | 20% REMAINING | : | |
| 3004 | MFP0001 | : | POWER UNIT PRICE ACQUISITION REQUEST | POWER ICS X | : | : | |
| 3005 | MFP0001 | : | : | : | : | : | |

ANALYSIS DATA

| DEVICE ID | DATE AND TIME | DATA TYPE | DATA DETAIL 1 | DATA DETAIL 2 | DATA DETAIL 3 | DATA DETAIL 4 | |
|---|---|---|---|---|---|---|---|
| MFP0001 | 2010/10/01 | PRINT STATUS | 2031 PAGES IN TOTAL | COLOR RATIO 15% | SINGLE SIDE RATIO 30% | DOUBLE SIDED PRINT 02:10:15 | |
| MFP0001 | : | TONER USE STATUS | BLACK 7% | CYAN 3% | MAGENTA 4% | YELLOW 2% | |
| MFP0001 | : | PAPER USE STATUS | A4 13% | Letter 20% | B4 7% | A3 1% | |
| MFP0001 | : | JAM STATUS | THREE TIMES | AVERAGE RECOVERY TIME 15:35 | MAXIMUM RECOVERY TIME 30:21 | SHORTEST INTERVAL 01:30:21 | |
| MFP0001 | : | POWER STATUS | 737 Kwh | FULL POWER 03:21 | LOW POWER 01:02 | STANDBY 4:45:22 | |
| MFP0001 | : | SECURITY | INCIDENT 22 | LOGON FAILURE 6 | NETWORK ACCESS 4 | : | |
| MFP0001 | : | CONTROL COMMAND | TONER ORDER 6 | PAPER REFILL 14 | UNIT PRICE REQUEST 12 | : | |
| MFP0001 | : | : | : | : | : | : | |

*FIG. 6*

| TARGET ICS | TARGET DATA | NECESSARY DATA | DATA STORAGE | DATA GENERATION | SIMULATED DATA ACTUALLY SENT |
|---|---|---|---|---|---|
| ICS A | EVENT | ALL | NOT REQUIRED | N/A | NOT SEND WHEN SUSPICIOUS |
| | CONTROL | LOG ACQUISITION POLICY UPDATE | DAILY AVERAGE | RANDOM GENERATION DAILY | GENERATE AT AVERAGE INTERVAL SO AS TO BE AT SAME FREQUENCY (FOR EXAMPLE, PER 8 HOURS IF THREE TIMES ON AVERAGE PER DAY) |
| | CONTROL | ALL | NOT REQUIRED | N/A | NOT SEND CONTROL OTHER THAN MENTIONED ABOVE |
| | Print Job | ALL | DAILY PER DAY OF WEEK | DAILY | SEND DAILY DATA OF DAY OF WEEK EVERY DAY |
| ICS B | Measured | ALL | Raw | REAL TIME DATA OF MATCHING DAY OF WEEK | PLAYBACK ALL DATA USING DATA OF DAY OF WEEK |
| ICS C | Measured | ALL | DAILY | TIME UNIT | SEND VALUE OBTAINED BY DIVIDING DAILY DATA BY 24 EVERY HOUR |
| ICS D | Measured | ALL | DAILY AVERAGE | DAILY | STORE ONLY AVERAGE DATA AND SEND ONCE PER DAY |
| ICS E | Measured | ALL | MAXIMUM TIME UNIT | TIME UNIT | SEND MAXIMUM ONE OF RECORDED TIME DATA EVERY HOUR |
| | Measured | EQUIPMENT STATUS | LATEST | TIME UNIT | KEEP RAISING ONLY LAST STATUS IN NORMAL TIME |
| ICS F | Measured | ALL | TIME UNIT | PREDICTION | SEND VALUE PREDICTABLE FROM PAST DATA EVERY HOUR |
| ⋮ | ⋮ | ⋮ | ⋮ | ⋮ | ⋮ |

*FIG. 7*

| TARGET ICS | TARGET DATA | DATA TYPE | CATEGORY | | | | |
|---|---|---|---|---|---|---|---|
| ICS A | Print Job | TABLE OF CONTENTS | MONDAY | 2125 PAGES IN TOTAL | COLOR RATIO 22% | SINGLE SIDE RATIO 28% | TOTAL PRINT TIME 01:48:07 |
| ICS B | Print Job | Raw | N/A | Raw Date | | | |
| | Print Job | Raw | N/A | | | | |
| ICS C | INVENTORY | TABLE OF CONTENTS | MONDAY | POWER 545 Kwh | TONER 27% | FULL POWER 236 hours | ... |
| | INVENTORY | TABLE OF CONTENTS | TUESDAY | | | | |
| ICS D | INVENTORY | TABLE OF CONTENTS | AVERAGE | POWER 622 Kwh | TONER 18% | FULL POWER 198 hours | ... |
| ICS E | EQUIPMENT STATUS | LATEST | N/A | LOW POWER | NO ERROR | TONER NORMAL | PAPER Low |
| ICS F | NUMBER OF PAGES PRINTED | TIME UNIT | 2010/10/01 8:00 TO 9:00 | 125 PAGES | | | |
| | NUMBER OF PAGES PRINTED | TIME UNIT | 2010/10/01 9:00 TO 10:00 | 163 PAGES | | | |
| ⋮ | ⋮ | ⋮ | ⋮ | | | | |

*FIG. 8*

| TYPE | ENTRY | THRESHOLD |
|---|---|---|
| STATISTICAL DATA | NUMBER OF PAGES PRINTED PER DAY | 10,000 |
| | NUMBER OF JAMS | 10 |
| | TIME TO RECOVERY | 2 |
| | POWER USAGE | 5 |
| CORRELATION DATA | TONER USAGE PER NUMBER OF PAGES PRINTED | 3 |
| | USE IN A PLURALITY OF LOCATIONS BY SAME USER | 2 |
| ATTACK DETECTION | SECURITY INCIDENT | 2 |
| | NUMBER OF SETTING CHANGES | 5 |
| | NUMBER OF SOFTWARE INSTALLATIONS /UNINSTALLATIONS | 3 |

*FIG. 13*

ANOMALY DETECTION SYSTEM, ANOMALY DETECTION METHOD, AND PROGRAM FOR THE SAME

CROSS-REFERENCE TO RELATED APPLICATIONS

This application is a continuation of U.S. patent application Ser. No. 13/988,485, filed May 20, 2013, which is a U.S. National Phase application which claims priority to International Application PCT/JP2012/051668, filed Jan. 26, 2012, which in turn claims priority to Patent Application No. JP 2011-070278, filed on Mar. 28, 2011. The contents of these applications are incorporated herein by reference in their entireties.

FIELD OF THE INVENTION

The present invention relates to anomaly detection techniques, and more particularly to an anomaly detection method, system, and program for preventing a system recognized to have an anomaly from affecting other systems.

BACKGROUND OF THE INVENTION

Modern society is a computerized society. Examples of systems using computers include: an information system mainly used in an office or the like; and an industrial control system ("ICS") used in a power plant, a pipeline, a chemical plant, or the like. Each individual ICS is made of a distinct system specific to the corresponding industry.

Most ICSs are systems mainly used in systems providing infrastructures, and accordingly, faults or anomalies are likely to cause serious human and economic damage. There are also systems in which several ICSs are connected via a network and exchange information with each other. In the case where data of an ICS having an anomaly is sent to other ICSs in such an environment of operating a plurality of ICSs, it is desirable that the receiving ICSs are kept from being significantly affected.

When operating a plurality of ICSs, the determination of whether or not a specific ICS has an anomaly imposes load on IT resources and also requires processing time, so that the ICS system itself may not be able to perform anomaly determination. Also, for typical information systems, it is possible to constantly perform anomaly determinations and, if there is a suspected system, to isolate the system offline and operate the other systems. However, this may be difficult for ICSs that are supposed to operate continuously.

For example, Japanese Unexamined Patent Publication No. 2000-214919 discloses a configuration control means that executes a procedure of minimizing functional loss of its own device according to anomaly information in the case where a monitored device has an anomaly. However, the disclosed technique is premised on two similar systems, namely, a master and a slave, in the case of an anomaly, and is not applicable to a plurality of ICSs which are different, distinct systems are connected via a network.

SUMMARY

Problems to be Solved by the Invention

The present invention is directed to the above-mentioned problems, and has an object of providing an anomaly detection system, method, and program for controlling data transfer between ICSs, detecting an ICS suspected of having an anomaly, and preventing the ICS from affecting any other ICS(s).

The present invention also has an object of providing an anomaly detection system, method, and program for, while performing a minimum process of detecting an ICS suspected of having an anomaly by usual ICS operation, determining whether or not the ICS actually has an anomaly, without affecting other ICSs.

Means for Solving the Problems

A method is described for handling an anomaly in an industrial control system (ICS) connected to a network with a plurality of other ICSs and an anomaly analyzer. An ICS receives status data from its own industrial process, and stores this status data as normal pattern data. The ICS transmits its own status data to one or more other ICSs. The ICS receives an indication from the anomaly analyzer that the ICS is suspected of having an anomaly. The ICS transmits alternate status data based on the normal pattern data stored during non-suspect operation, and stores the status data received from its own industrial process as real status data. In response to receiving from the anomaly analyzer an indication that the ICS is not operating anomalously, the ICS transmits the stored real data, and switches back to transmitting its own status data to one or more other ICSs.

In another aspect of the invention, the ICS receives and processes status data from one or more other ICSs. The ICS analyzes the status data received from other ICSs and notifies the anomaly analyzer if another ICS is suspected of having an anomaly. In response to receiving from the anomaly analyzer an indication that another ICS is suspected of operating anomalously, the ICS creates a rollback checkpoint with regard to processing the status data received from the suspect ICS. In response to receiving from the anomaly analyzer an indication that the suspect ICS is not operating anomalously, the ICS rolls back to the checkpoint all processing with regard to the status data received from the suspect ICS, deletes data received from the suspect ICS after checkpoint creation, receives and processes replacement data from the suspect ICS, and receives and processes as normal the status data from the suspect ICS.

In another aspect of the invention, in response to receiving from the anomaly analyzer an indication that the suspect ICS is operating anomalously, the ICS rolls back to the checkpoint all processing with regard to the status data received from the suspect ICS, and deletes data received from the suspect ICS after checkpoint creation.

BRIEF DESCRIPTION OF THE DRAWINGS

FIG. 5 is a diagram showing an example of data sent from an ICS to other ICSs.

FIG. 6 is a diagram showing another example of data sent from an ICS to other ICSs.

FIG. 7 is a diagram showing an example of a security policy 380 in the case where an anomaly is suspected, which is referenced to by an ICS.

FIG. 8 is a diagram showing recording contents of pattern data 360.

FIG. 13 is a diagram showing a method whereby the integrated analyzer 170 detects an anomaly of an ICS.

DETAILED DESCRIPTION OF THE INVENTION

The following describes the present invention by way of an embodiment, though the present invention is not limited to this embodiment.

Figure 1:
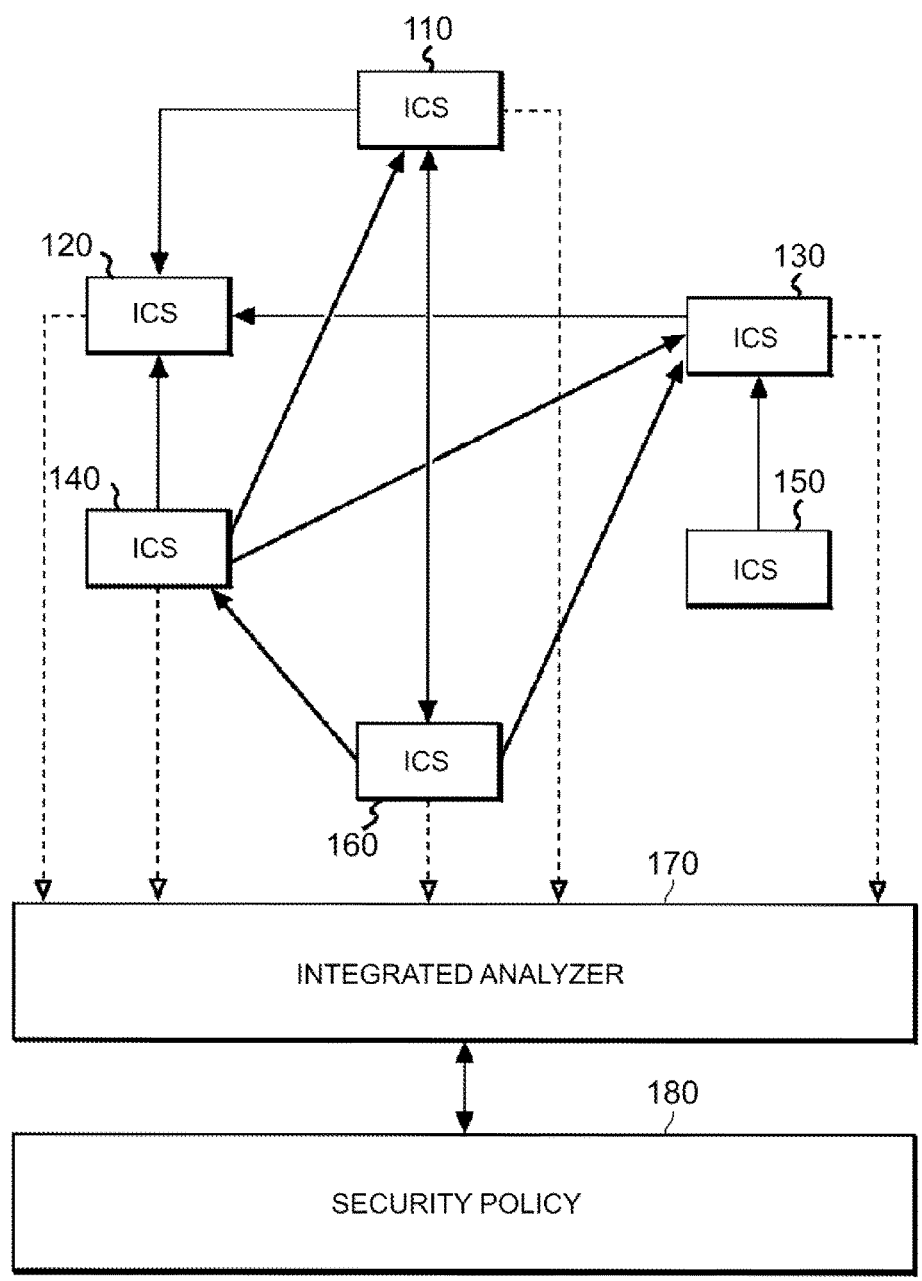
FIG. 1 is a schematic diagram of a system according to an embodiment of the present invention.

FIG. 1 is a schematic diagram of a system according to an embodiment of the present invention. ICSs 110 to 160 are industrial control systems each of which operates with distinct hardware and a distinct OS. Each ICS has not only its own network with a distinct protocol but also a general-purpose network with general-purpose equipment, which is connected to the other ICSs and an integrated analyzer 170 via a firewall. Each ICS periodically sends analysis data, including an operating status of the ICS, to the integrated analyzer 170 as monitoring data. The integrated analyzer 170 analyzes the monitoring data and identifies any ICS suspected of having an anomaly, and is connected to a security policy 180 that defines an action in the case where the ICS is determined to have an anomaly. The security policy 180 is referenced by the integrated analyzer 170.

Figure 12:
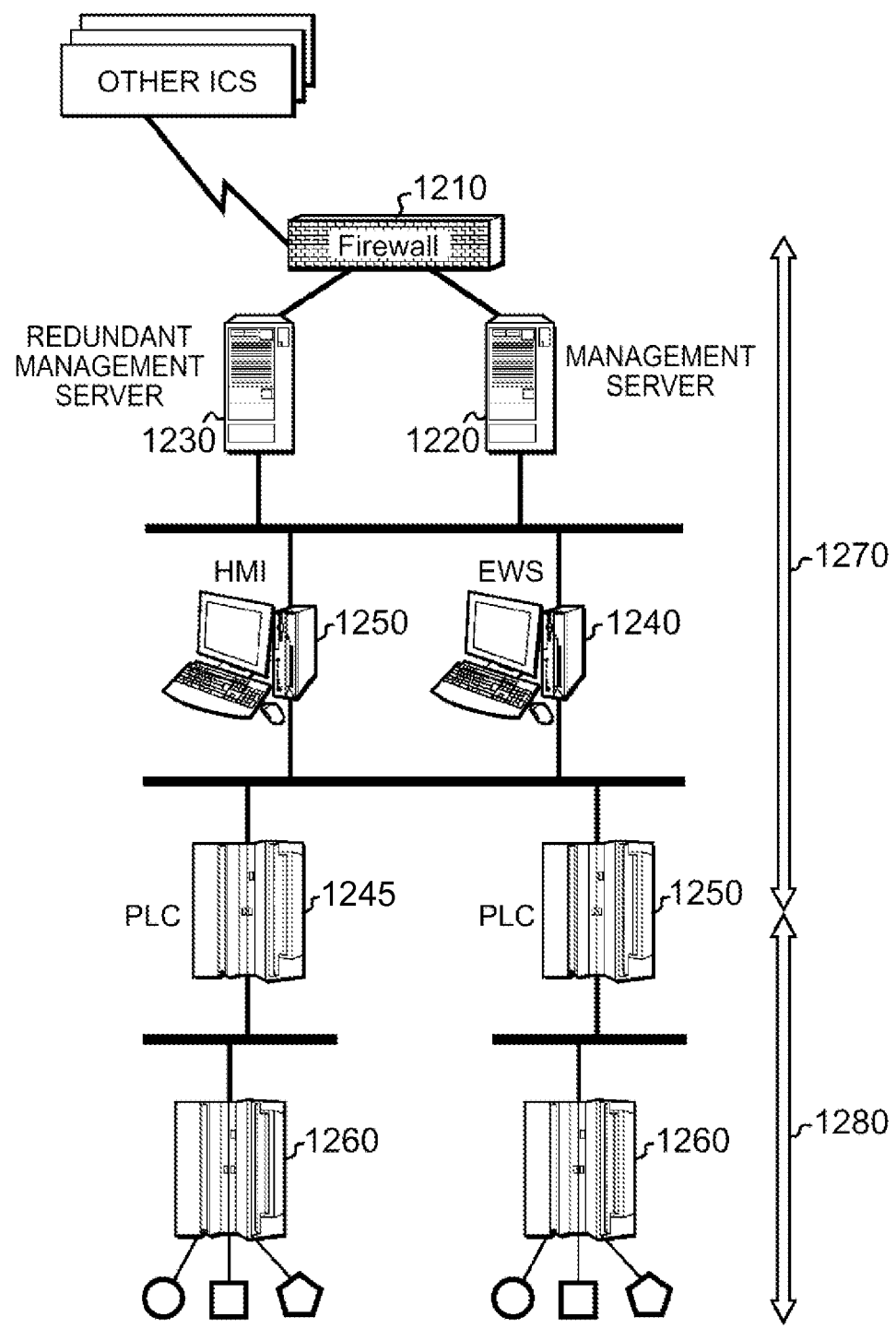
FIG. 12 is a diagram of physical machines of a typical ICS.

FIG. 12 is a diagram of physical machines of a typical ICS. A management server 1220 communicates with the external network via a firewall 1210. A redundant management server 1230 is also provided in case the management server 1220 is fails. The ICS is roughly divided into a general-purpose network region 1270 including a LAN according to TCP/IP and Ethernet™, and a dedicated network region 1280 in which dedicated equipment according to distinct hardware and a distinct OS is connected by a dedicated protocol.

An HMI (Human Machine Interface) 1250 connected to the management server 1220 displays results of a monitoring and analyzer for various data. An EWS (Engineering Work-Station) 1240 performs operation management and communicates with each PLC (Programmable Logic Controller) 1250 for control of various equipment. The dedicated network 1280 is connected to the PLCs 1250 called a sequencer.

A PLC 1250 is a state machine, unlike a von Neumann computer. Its operating program is written in a programming language for a relay circuit. The program is a result of encoding an electric circuit, and so cannot be created by a usual computer programmer.

Each PLC 1250 is connected to dedicated equipment 1260, and each dedicated equipment 1260 is connected to an actuator, a controller, and various sensors. Examples of these include measuring instruments such as a temperature sensor, a humidity sensor, a pressure sensor, an air conditioning sensor, a flowmeter, a water gauge, an illuminometer, a wattmeter, a power usage counter, a print counter, and a human sensor, a valve switch, a thermal power controller, a compressor, a pump, a motor, and a print drum.

ICSs are used not only in infrastructure systems such as a chemical plant, a thermal power plant, a water power plant, a nuclear power plant, a reactor control system, and the like, but also for control of, as more familiar examples, an elevator, an automatic door, a boiler, a theme park, various attractions, a print system, and the like. A print system is described as an exemplary embodiment of the present invention.

Figure 2:
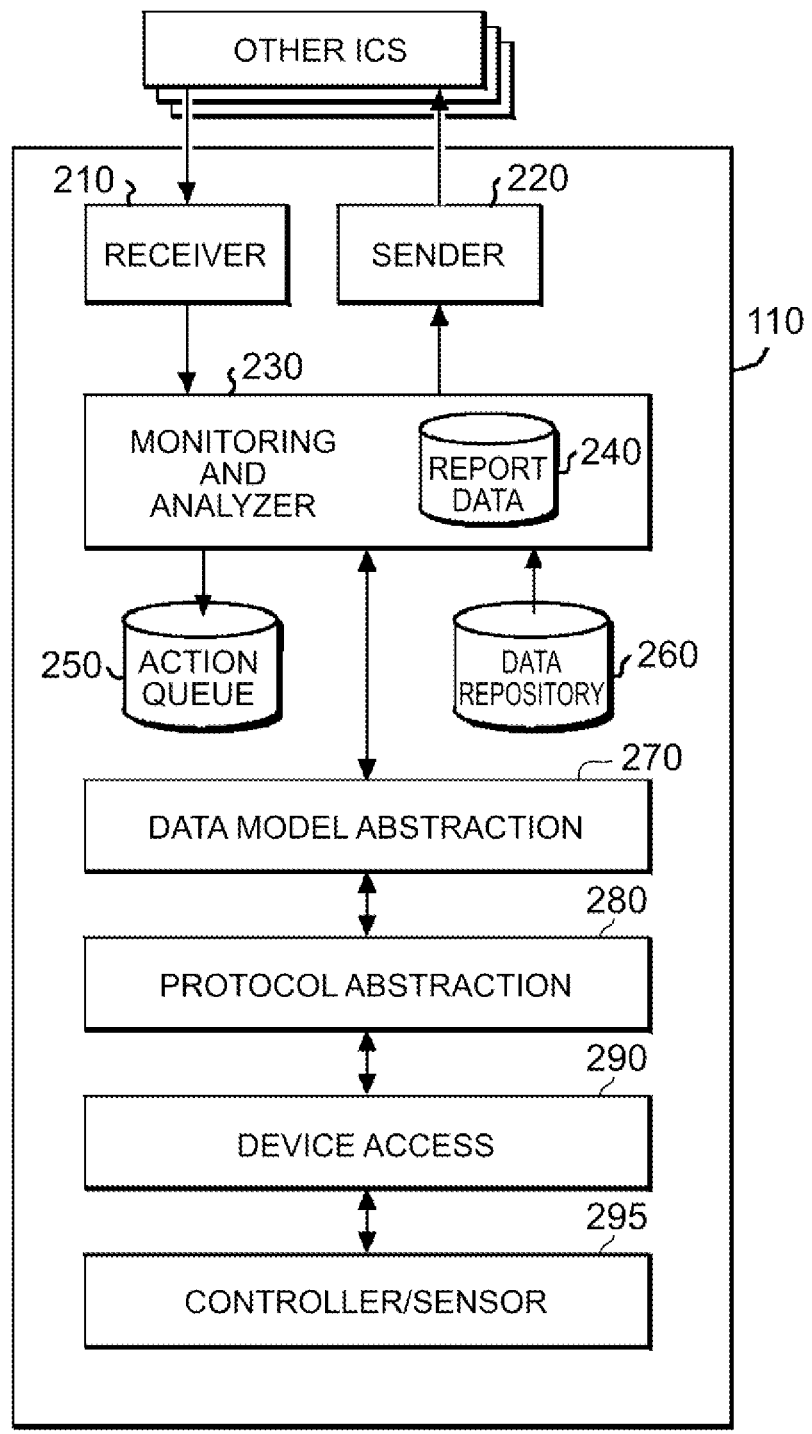
FIG. 2 is a functional block diagram of a typical ICS.

FIG. 2 is a functional block diagram of a typical ICS 110. The ICS 110 includes: a receiver 210 (receiving unit) for receiving data from other ICSs; a device access 290 for acquiring data from a controller/sensor 295; a protocol abstraction 280 for aggregating and abstracting data from various data accesses 290; a data model abstraction 270 for abstracting data from the protocol abstraction 280 as a data model; a monitoring and analyzer 230 for monitoring and analyzing data from the data model abstraction 270 and data from the receiver 210 for receiving data from other ICSs; an action queue 250 for storing an action decided according to the result of the monitoring and analyzer 230; a data repository 260 for recording various data of the monitoring and analyzer 230; report data 240 for recording a report of the monitoring and analyzer 230; and a sender 220 (sending unit) for sending data of the report data 240. It should be noted that the above-mentioned structure is a typical structure, and each ICS further has a distinct data structure and a unique interface.

Figure 3:
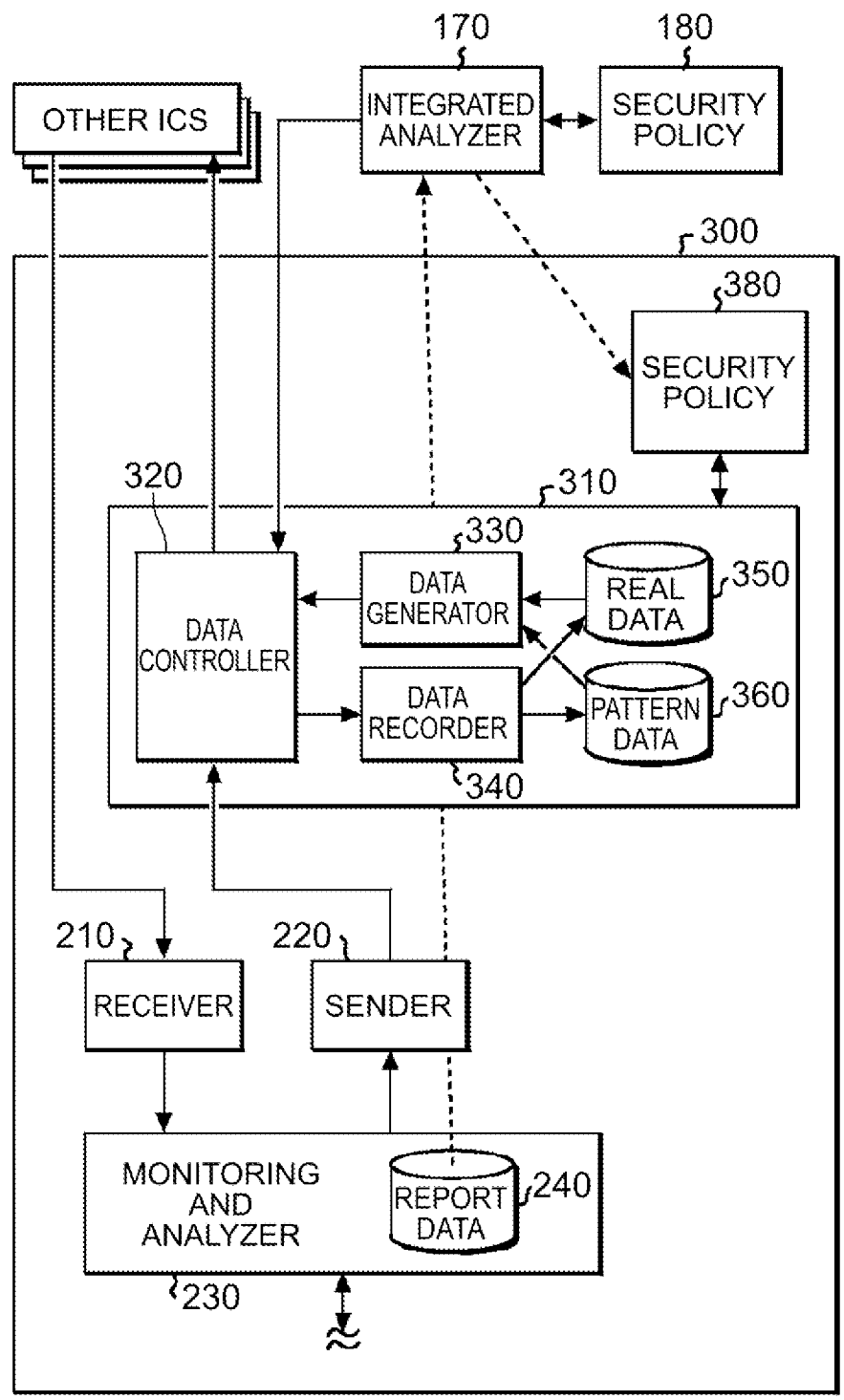
FIG. 3 is a functional block diagram of an ICS according to the present invention.

FIG. 3 is a functional block diagram of an ICS according to the present invention. Structures unique to the present invention, which differ from those in FIG. 2, are a wrapper 310, the integrated analyzer 170, the security policy 180, and a security policy 380. The wrapper 310 is a component for minimizing, when the ICS operates anomalously, its effect on other ICSs.

The wrapper 310 includes: a data recorder 340 for recording data during normal operation (normal mode) of the ICS to pattern data 360 as raw data, aggregate data, and statistical data; and a data generator 330 for generating normal data from the pattern data 360 during operation (pseudo normal mode) in a state where an anomaly is suspected. A data controller 320 decides the operation of these components. The data controller 320 controls data sent to other ICSs. The data controller 320 receives data from the sender 220, and controls the sending data so as not to affect other ICSs. This control is performed according to a notification from the integrated analyzer 170.

The sender 220 references to the report data 240, which is the result of the monitoring and analyzer 230 analyzing the ICS operating status and the data received from other ICSs and, if any other ICS is suspected of having an anomaly, sends the information to the integrated analyzer 170 by including it in monitoring data.

The integrated analyzer 170 analyzes monitoring data from the wrappers 310 of the plurality of ICSs, specifies an ICS that appears to have an anomaly, and issues an instruction to shift to the pseudo normal mode to the data controller 320 of the ICS. The pseudo normal mode is a mode in which, in the case where there is a possibility that the ICS operates anomalously, the ICS sends data to other ICSs as if the ICS is normal.

When analyzing the monitoring data from the wrappers of the plurality of ICSs, the integrated analyzer 170 performs a given action with reference to the security policy 180. A similar security policy is included in each individual ICS. The ICS 300 in FIG. 3 includes the security policy 380, in which given actions performed by the wrapper 310 and data recording and generation rules are included. The security policy 380 is updated by the integrated analyzer 170 according to need.

Figure 4:
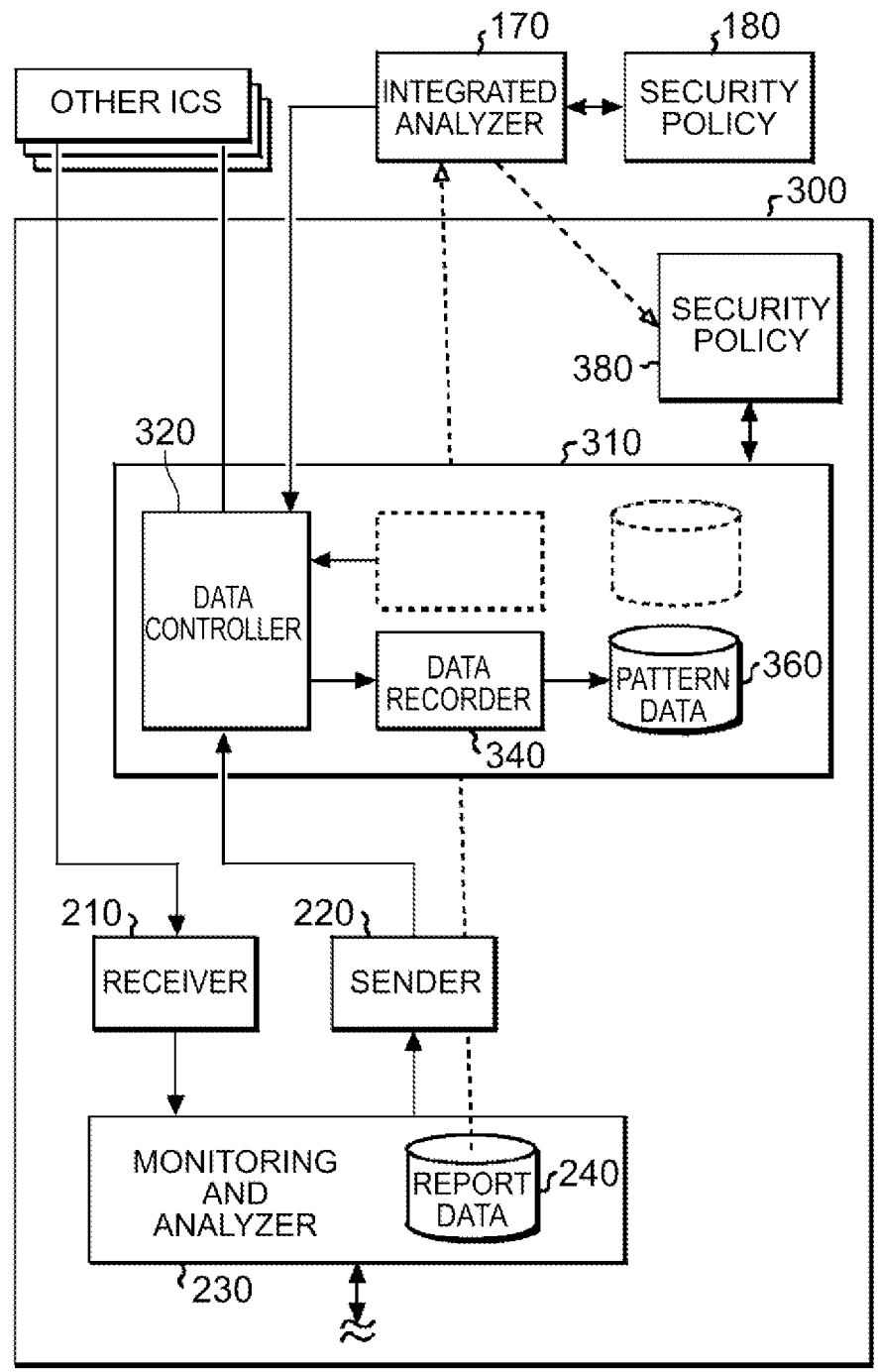
FIG. 4 is a diagram for describing ICS operation in normal time.

FIG. 4 is a diagram for describing ICS operation in normal time. First, the data controller 320 receives event data output from the sender 220, and directly sends the event data to other ICSs. At the same time, the data recorder 340 stores the event data as the pattern data 360. This storage is performed by any of recording methods for raw data, aggregate data, sampling data, and the like. These recording methods are unique to the ICS and are defined in the security policy 380.

The data controller 320 selects the storage method based on the type of event data with reference to the security policy 380, and notifies the storage method to the data recorder 340. The security policy 380 is notified from the integrated analyzer 170 and updated according to need.

Figure 14:
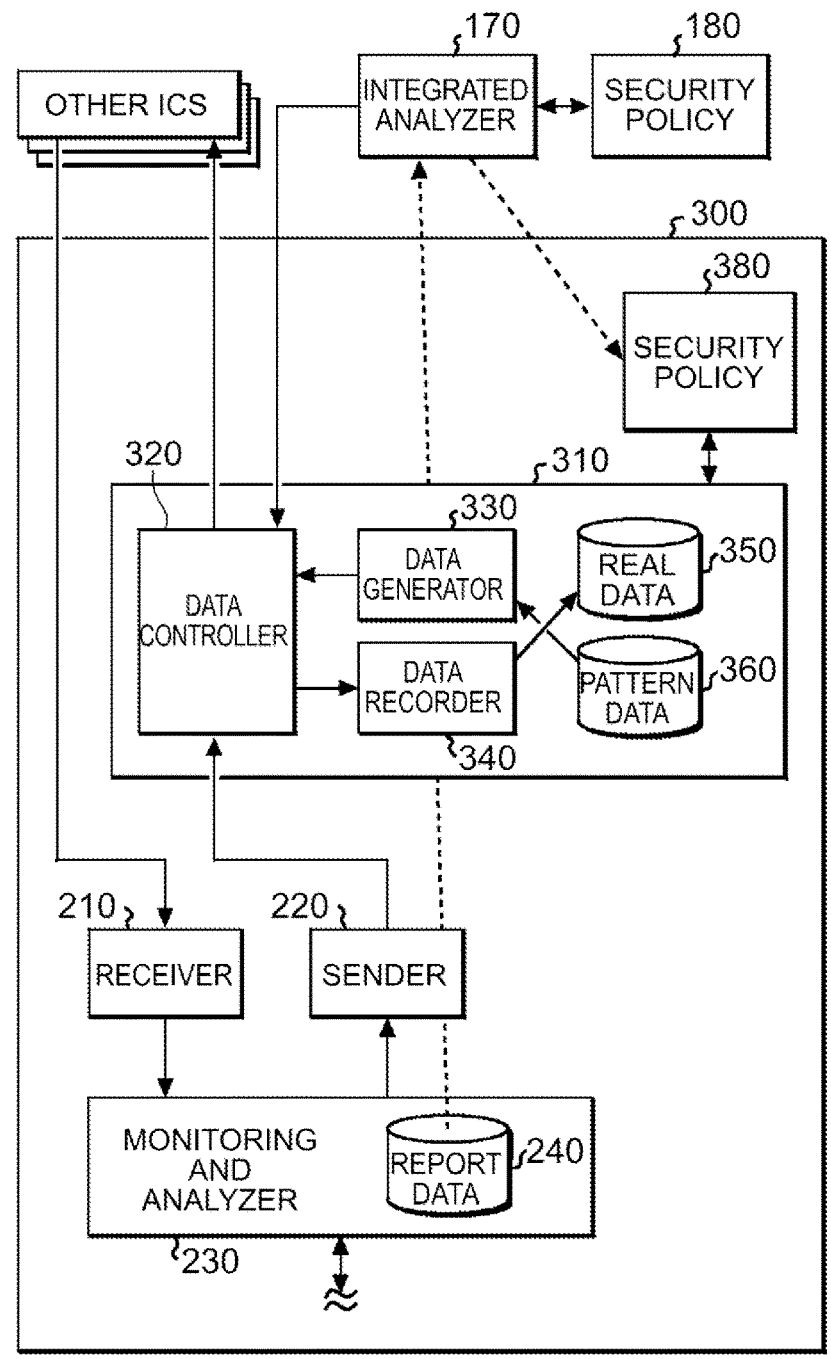
FIG. 14 is a diagram showing operation of an ICS suspected of having an anomaly.

The following describes operation of an ICS suspected of having an anomaly, using FIG. 14. First, the integrated analyzer 170 receives monitoring data from the sending unit of each ICS. The integrated analyzer 170 notifies the wrapper 310 of an ICS suspected of having an anomaly based on the monitoring data, to shift to the pseudo normal mode.

Here, preferably the integrated analyzer 170 also sends information (e.g. ICS number) about the ICS suspected of having an anomaly, to the wrappers of the other ICSs. This enables each ICS that is receiving data from the ICS suspected of having an anomaly, to recognize subsequently received data as pseudo normal data. The integrated analyzer 170 then analyzes whether or not the ICS actually has an anomaly. The monitoring data preferably includes anomaly suspicion information regarding the other ICSs.

Figure 9:
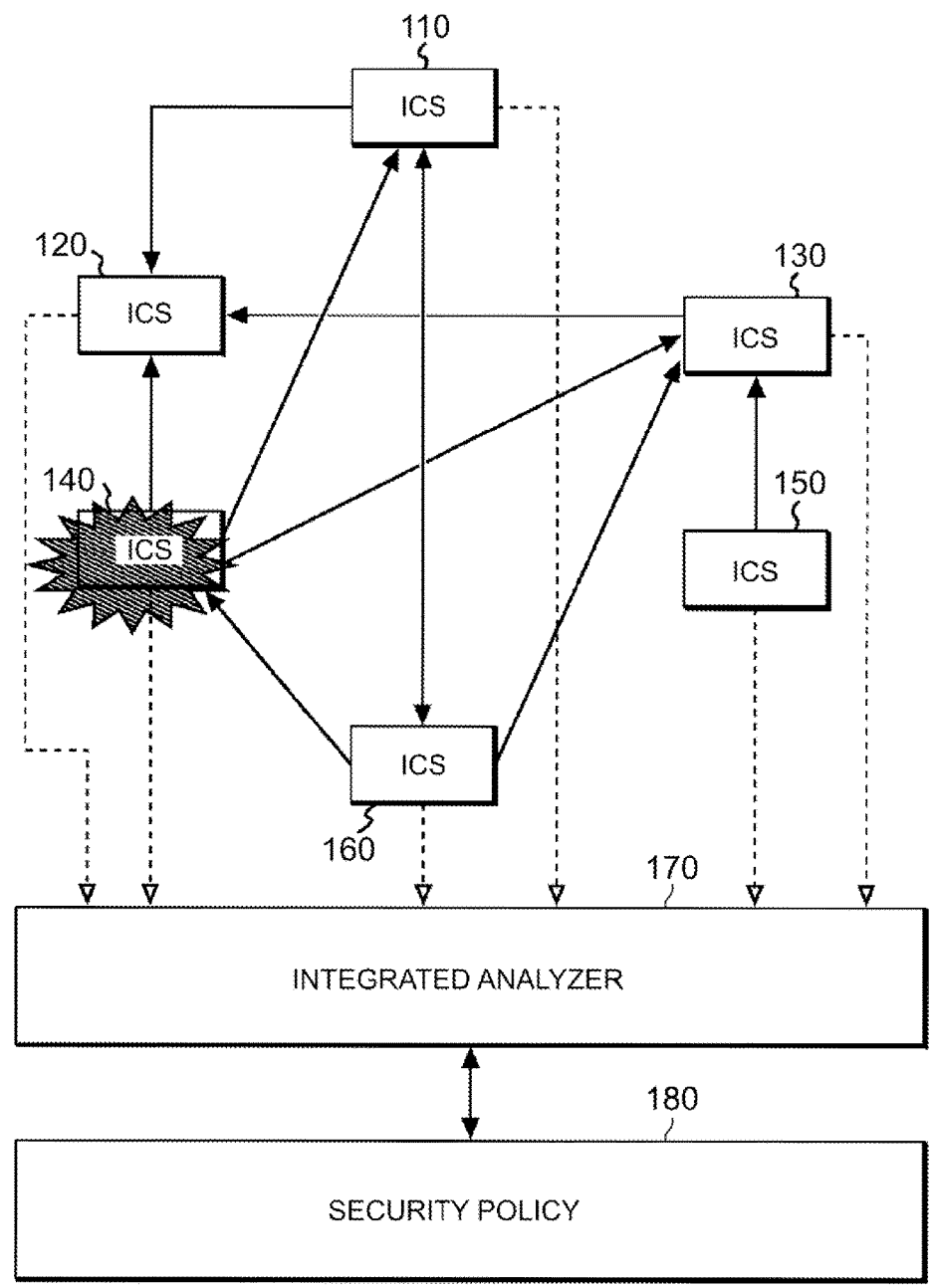
FIG. 9 is a diagram showing a situation where an ICS 140 is performing an operation that appears anomalous.

FIG. 9 is a diagram showing a situation where the ICS 140 is performing an operation that appears anomalous. Data different from data in normal time is sent from the ICS 140 to the ICSs 110 to 130. Each of the ICSs 110 to 130 sends anomaly detection information regarding the ICS 140, by including it in the monitoring data sent to the integrated analyzer. The integrated analyzer 170 analyzes the monitoring data from each ICS, and notifies the ICS 140 suspected of having an anomaly to shift to the pseudo normal mode. The integrated analyzer 170 then analyzes whether or not the ICS 140 actually has an anomaly and performs a necessary action, with reference to the security policy 180.

Upon receiving the notification to shift to the pseudo normal mode, the ICS performs any of the following operations according to the security policy, though different depending on the features of the ICS: (A) send simulated data same as in normal time; (B) send raw data; or (C) Send no data at all.

The case (A) is described in more detail below, using FIG. 14. The data recorder 340 of the ICS suspected of having an anomaly records the data from the sending unit, as real data 350. The data generator 330 generates, according to the security policy 380, simulated data from the raw data, aggregate data, and statistical data recorded in the pattern data 360, and sends the simulated data to each ICS. This enables each ICS to operate normally without hindrance.

When the integrated analyzer 170 sends, to the ICS and each of the other ICSs, a notification that there is no anomaly as a result of analysis, the ICS returns to the state in normal time.

Figure 15:
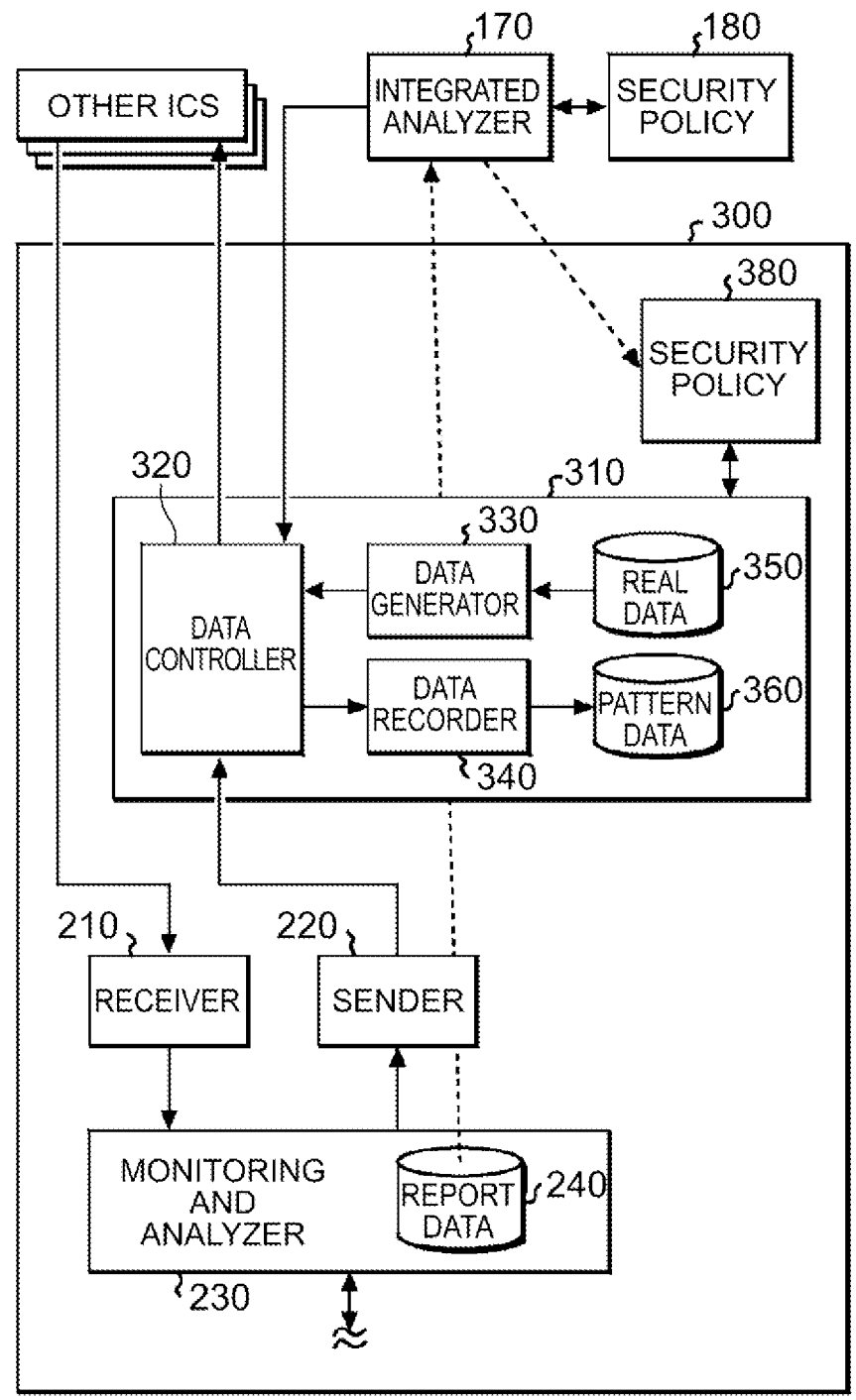
FIG. 15 is a diagram showing operation in the case where an ICS is determined to have no anomaly.

FIG. 15 is a diagram showing operation in the case where the ICS is determined to have no anomaly (in the case of receiving a notification to shift to the normal mode). The data recorder 340 records raw data, aggregate data, and statistical data in the pattern data 360. The wrapper 320 notifies each data sending destination of data replacement. The data generator 330 reads data from the real data 350 which is the raw data recorded in the pseudo normal mode, and sends the read data simultaneously. After completing the sending, the data generator 330 abandons the real data 350. Upon receiving the data replacement notification, each ICS rolls back and replaces the data received in the pseudo normal mode with the simultaneously sent data.

In the case where the integrated analyzer 170 determines that there is an anomaly as a result of analysis, the integrated analyzer 170 notifies the anomaly determination to the wrapper 320 of the ICS and the wrapper of each of the other ICSs and also performs a given action, according to the security policy 180. The ICS operating anomalously, after being brought to an emergency stop, waits for a human or machine repair process. Each ICS receiving data in the pseudo normal mode rolls back and deletes the data received in the pseudo normal mode.

Factors causing an anomaly of an ICS include a fault of a sensor or a counter, manipulation, data tampering, physical attack, and theft by a malicious user or malware, and so on. A plurality of methods (threshold, rule, and situation) are available as methods for detecting anomalies.

FIG. 13 is a diagram showing a method whereby the integrated analyzer 170 detects an anomaly of an ICS. An example of mainly using thresholds is shown in FIG. 13. In the case where an unusual value is detected as compared with statistical data, it is determined that there is an anomaly.

For example, a case where the number of pages printed per day is not less than 10,000, the number of jams is not less than 10, the time to recovery is not less than 2 hours, or the power usage is not less than 5 kw is determined as an anomaly. There is also an anomaly detection method by comparison of correlation data. Examples of this include the case of abnormal toner usage or the case where one user is operating in a plurality of locations.

There is also anomaly detection according to signs of attack. Examples of this include a predetermined number or more of occurrences of security incidents, the number of setting changes including power ON/OFF and network disconnection, and the number of software installations/uninstallations. The integrated analyzer 170 receives the monitoring data from the sending unit of each individual ICS, and statistically and aggregately computes whether or not any threshold in FIG. 13 is exceeded to determine whether or not there is an anomaly. These thresholds are included in the security policy 180.

The differences between the security policy 180 and the security policy 380 of each individual ICS lie in that the above-mentioned statistical anomaly determination information is provided and that the security policy 380 includes a policy unique to the system of each ICS.

FIG. 5 shows an example of data sent from an ICS to other ICSs. For example, it is indicated in an event ID 1001 that a paper jam is recovered as an event of raw data at time Oct. 01, 2010 09:05:40 in a device ID MFP0001. Regarding logs for aggregate data and statistical data, it is indicated in a log ID 2001 that monochrome single sided print of 5 pages is performed by user B as a print job in the device ID MFP0001.

FIG. 6 shows another data sent from an ICS to other ICSs. Control commands shown in FIG. 6 are also recorded in the action queue 250 by the monitoring and analyzer 230. Meanwhile, analysis data is recorded in the data repository 260 and also used for the report data 240.

FIG. 7 shows an example of the security policy 380 in the case where an anomaly is suspected, which is referenced to by each ICS. A target ICS field shows a unique name of the ICS, a target data field shows which data is target data, a necessary data field shows which data is to be sent, a data storage field shows whether or not data storage is required and which data is to be stored, a data generation field shows a data generation method of the data generator 330, and a simulated data field shows a sending frequency of data actually sent.

That is, the security policy 380 includes the definition of what kind of simulated data is sent in the pseudo normal mode and what is recorded for sending the simulated data, in addition to the security policy unique to the ICS. The security policy 380 including such data recording and generation rules is appropriately updated by the integrated analyzer 170.

For example, there are the following variations of simulated data generation: (A) send no data because it is meaningless for an event or control for which a process occurs instantly; (B) send raw data in the case where data in normal time itself is necessary; (C) send filtered (minimum, maximum, average, latest, randomly-generated) data; or (D) send time-unit, daily, weekly, average aggregate/statistical data.

In this way, data recorded/stored in normal time is decided according to the features of each ICS, to decide how the data generator 330 generates simulated data from the stored data.

FIG. 8 shows the recording contents of the pattern data 360. The pattern data 360 is recorded based on the security policy 380 for each ICS. As shown in FIG. 8, the target data recorded/stored differs depending on the ICS. The number of pages printed in total and the statistical values are recorded in ICS A, whereas raw data of print is recorded in ICS B. This is because print jobs are designated as the data storage target and the corresponding data generation is daily in the security policy of ICS A in FIG. 7. Note that control data is randomly generated at the time of data generation and so is not recorded.

On the other hand, raw data is designated as the data storage target and the corresponding data generation is real time in the security policy of ICS B in FIG. 7. Thus, the pattern data is recorded based on the security policy 380 according to the features of each ICS.

Figure 10:
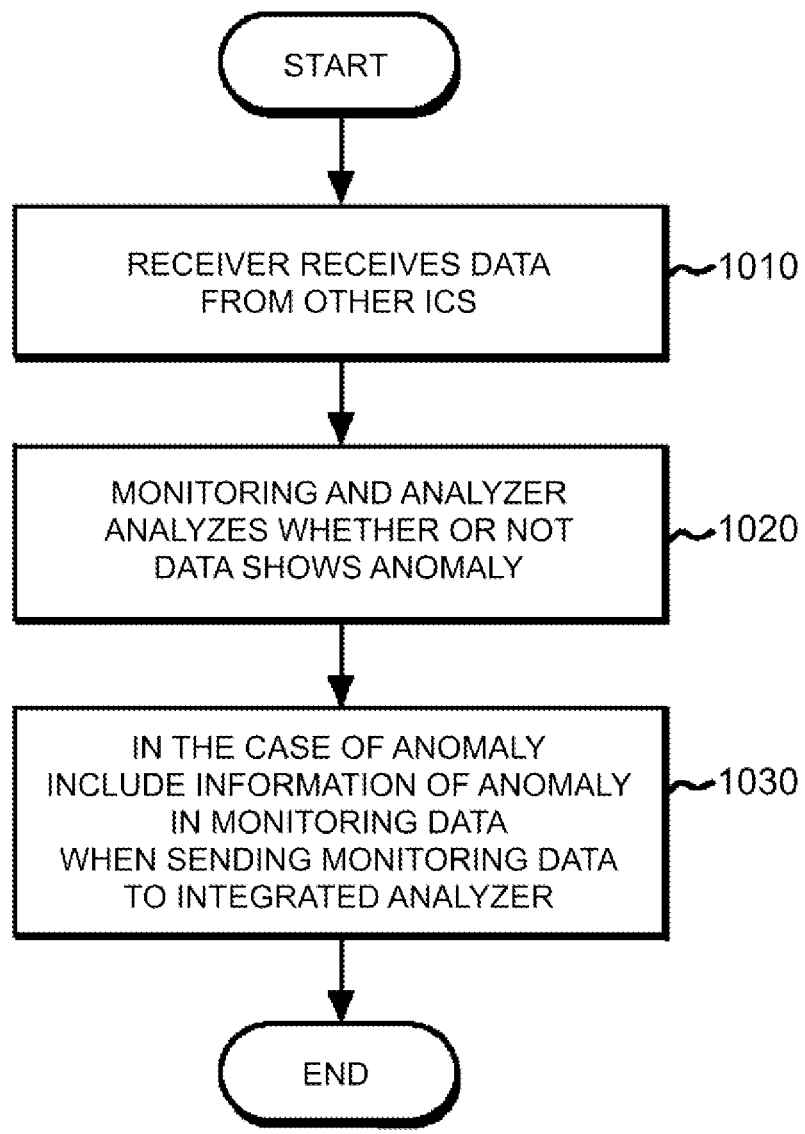
FIG. 10 is an operation flowchart of an ICS.

FIG. 10 is an operation flowchart of each ICS. In step 1010, the receiver receives data from other ICS(s). In step 1020, the monitoring and analyzer analyzes whether or not the data of the other ICS shows an anomaly. In step 1030, in the case of an anomaly, the ICS sends monitoring data including not only its own operating status information but also information of the ICS showing an anomaly, to the integrated analyzer 170.

Figure 11:
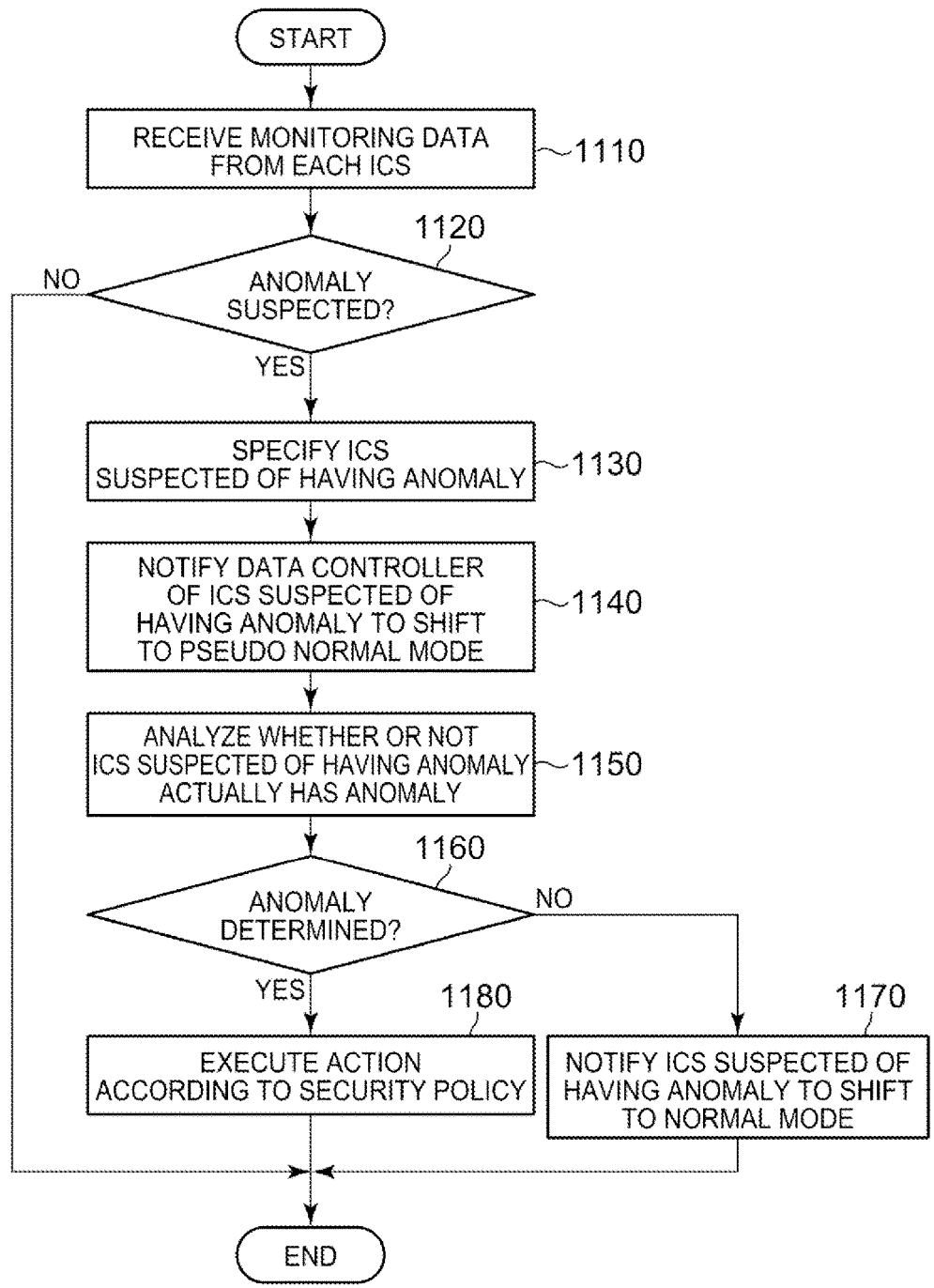
FIG. 11 is an operation flowchart of an integrated analyzer 170.

FIG. 11 is an operation flowchart of the integrated analyzer 170. First, in step 1110, the integrated analyzer 170 receives monitoring data from each ICS. Next, in step 1120, the integrated analyzer 170 determines whether or not an anomaly is suspected, from the monitoring data. The monitoring data includes a number of an ICS suspected of having an anomaly and various data values. In the anomaly suspicion determination, in the case where information of an ICS showing an anomaly is included in monitoring data of an ICS, the integrated analyzer 170 determines that an anomaly is suspected. In the case where information of an ICS showing an anomaly is not included in monitoring data of a single ICS and the monitoring data significantly exceeds a threshold, the integrated analyzer 170 also determines that an anomaly is suspected.

In the case where no anomaly is suspected in step 1120, the integrated analyzer 170 ends the process. In the case where an anomaly is suspected in step 1120, in step 1130 the integrated analyzer 170 specifies an ICS number of an ICS suspected of having an anomaly. Next, in step 1140, the integrated analyzer 170 notifies the data controller of the ICS suspected of having an anomaly, to shift to the pseudo normal mode. Preferably, the integrated analyzer 170 also sends the information to the other ICSs. The other ICSs recognize data from the suspected ICS as data sent in the pseudo normal mode.

In step 1150, the integrated analyzer 170 analyzes whether or not the ICS suspected of having an anomaly actually has an anomaly. In step 1160, the integrated analyzer 170 checks whether or not the anomaly is determined to exist in the ICS. In the case where the anomaly is determined to exist in the ICS, in step 1180 the integrated analyzer 170 executes a given action with reference to the security policy 180. In the case where the anomaly is not determined to exist in the ICS, in step 1170 the integrated analyzer 170 notifies the ICS suspected of having an anomaly to shift to the normal mode, and ends the process. Preferably, the integrated analyzer 170 also sends the non-anomaly notification to the other ICSs.

Figure 16:
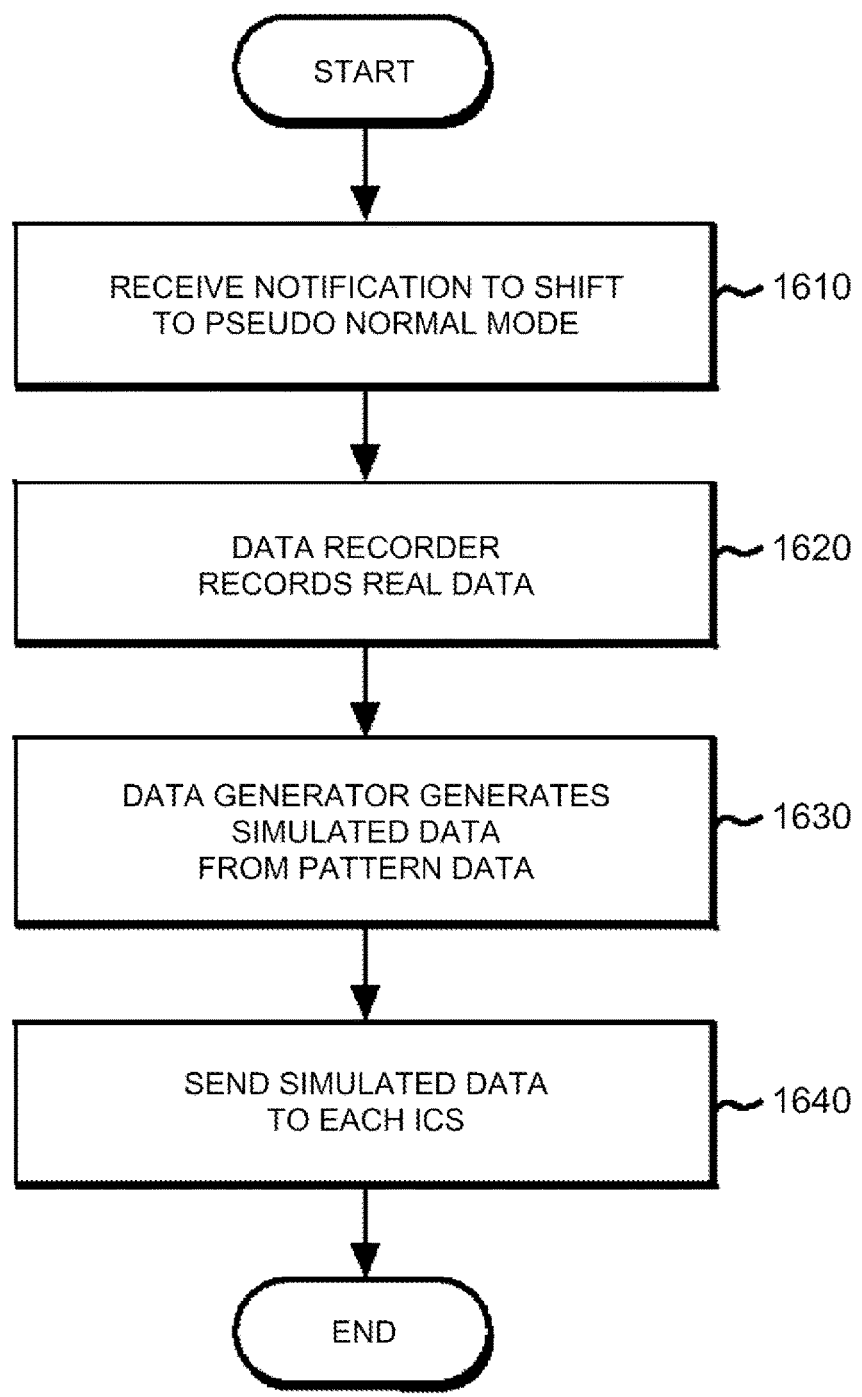
FIG. 16 is an operation flowchart of an ICS receiving a pseudo normal mode from the integrated analyzer 170.

FIG. 16 is an operation flowchart of an ICS receiving the pseudo normal mode. First, in step 1610, the ICS receives the notification to shift to the pseudo normal mode. Next, in step 1620, the data recorder 340 records the real data 350. In step 1630, the data generator 330 generates simulated data from the pattern data 360. In step 1640, the data controller 320 sends the generated simulated data.

Figure 17:
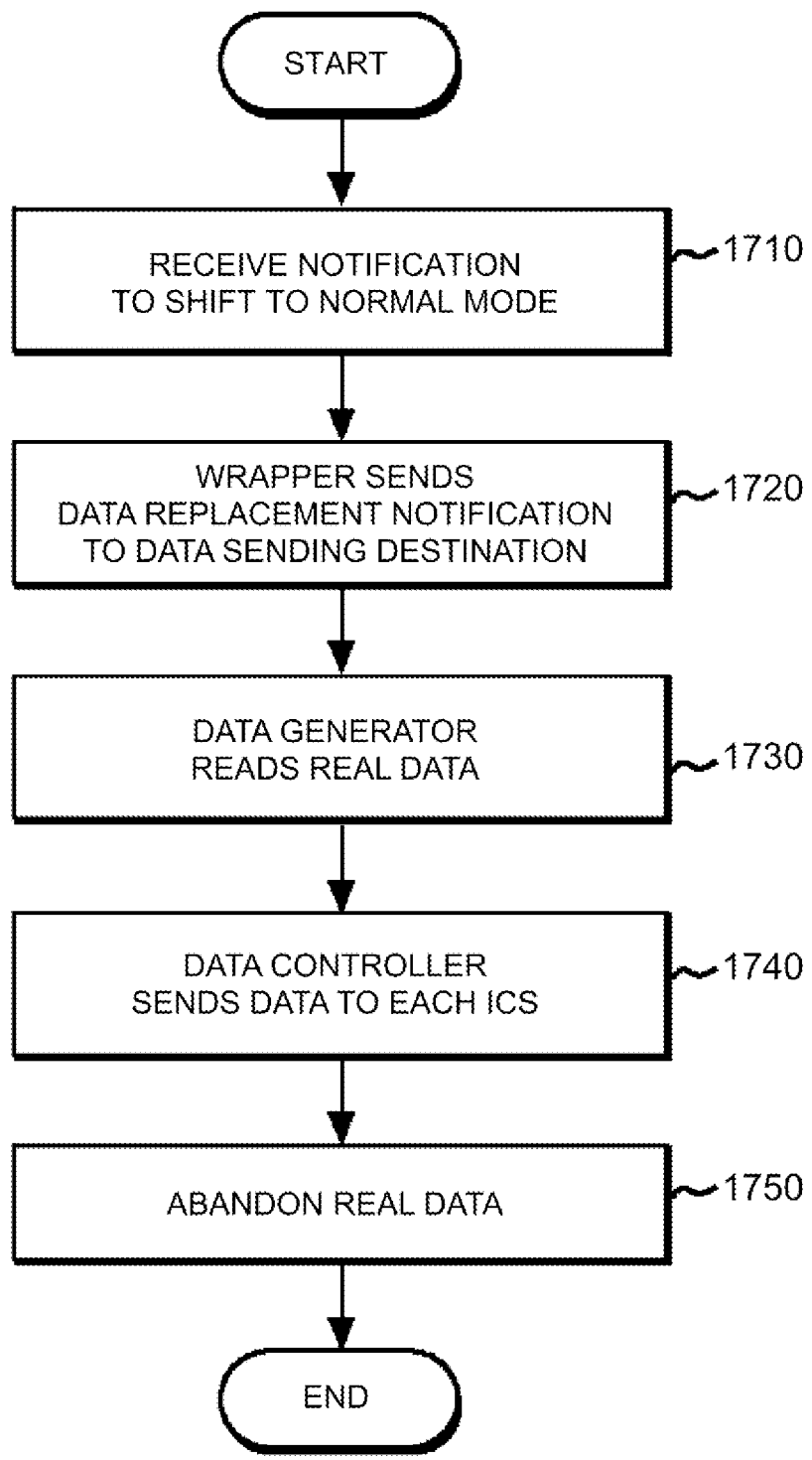
FIG. 17 is an operation flowchart of an ICS receiving a non-anomaly notification from the integrated analyzer 170.

FIG. 17 is an operation flowchart of an ICS receiving the notification to shift to the normal mode from the integrated analyzer 170. First, in step 1710, the ICS receives the normal mode shift notification from the integrated analyzer 170. Next, in step 1720, the wrapper sends the data replacement notification to each data sending destination. In step 1730, the data generator 330 reads data from the real data 350 which is the raw data recorded in the pseudo normal mode. In step 1740, the data controller 320 sends the data simultaneously. Lastly, in step 1750, the real data 350 is deleted.

Preferably, the data controller 320 notifies each sending destination ICS that the real data is to be sent simultaneously. Next, in step 1740, the data controller 320 sends the simulated data to each sending destination ICS simultaneously. Each sending destination ICS replaces (rolls back and replaces) the data received in the pseudo normal mode with the simultaneously sent real data. In step 1750, the real data 350 is abandoned.

Figure 18:
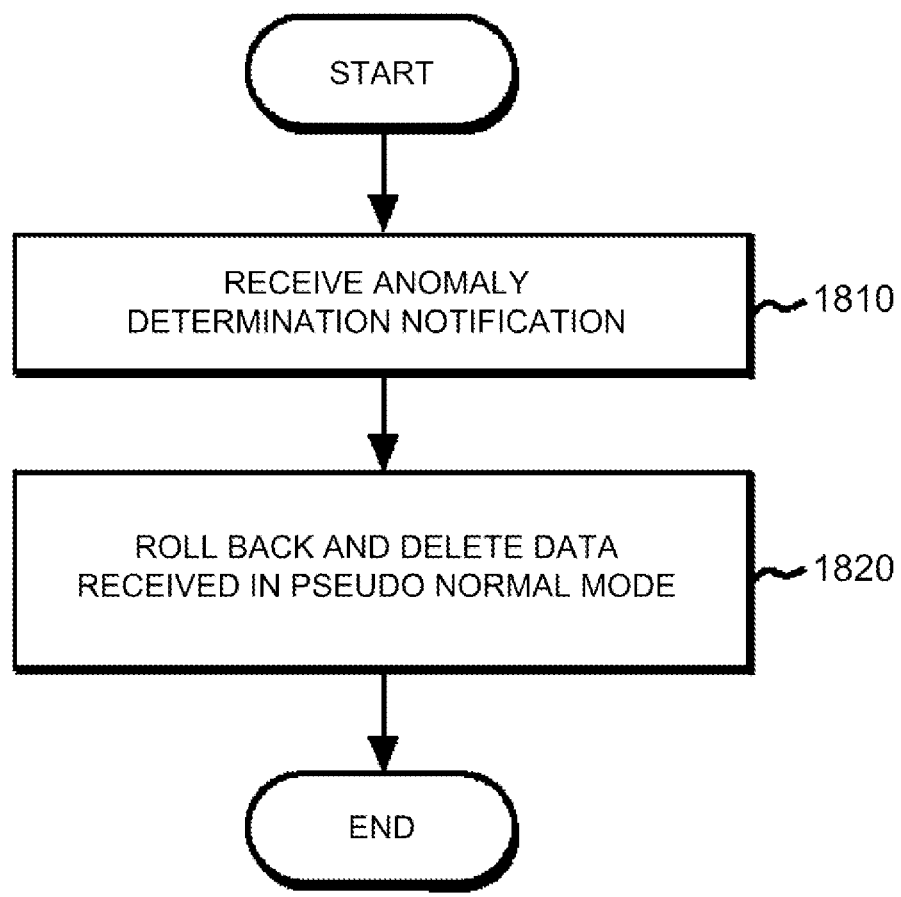
FIG. 18 is an operation flowchart of each other ICS receiving an anomaly determination notification from the integrated analyzer 170.

The anomalous ICS receiving the anomaly determination notification from the integrated analyzer 170 enters an operation stop state. FIG. 18 is an operation flowchart of each of the other ICSs receiving the anomaly determination notification from the integrated analyzer 170. First, in step 1810, the ICS receives the anomaly determination notification. Next, in step 1820, the ICS rolls back and deletes the data received in the pseudo normal mode of the anomalous ICS.

As described above, according to the embodiment of the present invention, it is possible to provide an anomaly detection system, an anomaly detection device, an anomaly detection method, a program, and a recording medium for efficiently detecting an ICS suspected of having an anomaly in a system and causing a given action to be executed so as not to affect other ICSs.

The computer EWS and HMI in the general-purpose network region in the ICS and the integrated analyzer according to the embodiment of the present invention may have the same structure as a computer used in an information system as a hardware structure, that is, may be implemented by a typical computer including a CPU, a memory, an external storage device, a bus, and a communication interface.

Moreover, an anomaly detection device is provided by loading a computer executable program into a computer device to realize each functional unit. Such a program may be realized by a computer executable program written in a programming language such as FORTRAN, COBOL, PL/I, C, C++, Java®, Perl, Ruby, or the like, and stored in a device readable recording medium and distributed.

Though the present invention has been described by way of the embodiment and examples shown in the drawings, the present invention is not limited to the embodiment shown in the drawings. Any modifications and modes conceivable by a person skilled in the art are included in the scope of the present invention as long as the operational advantages of the present invention are achieved.

What is claimed is:

1. A method for handling an anomaly in a network of industrial control system (ICS), the network also including an anomaly analyzer c, the method comprising:
   receiving, by an ICS, its own status data from its own industrial process, and storing this status data as normal pattern data;
   transmitting, by the ICS, its own status data to one or more other ICSs;
   determining, by the anomaly analyzer, that the ICS is suspected of operating anomalously, and transmitting, by the anomaly analyzer to the ICS and to the one or more other ICSs, an indication that the ICS is suspected of operating anomalously;
   in response to receiving, by the ICS, the indication from the anomaly analyzer that the ICS is suspected of having an anomaly, transmitting, by the ICS to the one or more other ICSs, alternate status data based on the normal pattern data stored during non-suspect operation, and storing the status data received from its own industrial process as real status data;
   in response to receiving, by the one or more other ICSs from the anomaly analyzer, the indication that the ICS is suspected of operating anomalously, creating a rollback checkpoint with regard to processing the status data received from the ICS;
   in response to receiving, by the ICS from the anomaly analyzer, an indication that the ICS is not operating anomalously, the ICS transmitting the stored real data, and switching back to transmitting its own status data to one or more other ICSs;
   in response to receiving, by the one or more other ICSs from the anomaly analyzer, an indication that the ICS is not operating anomalously, the one or more other ICSs:
      rolling back to the checkpoint all processing with regard to the status data received from the suspect ICS;
      deleting status data received from the ICS after checkpoint creation;
      receiving and processing stored real data from the ICS; and
      receiving and processing as normal subsequent status data from the ICS;
   in response to receiving, by the one or more other ICSs from the anomaly analyzer, an indication that the ICS is operating anomalously, the one or more other ICSs:
      rolling back to the checkpoint all processing with regard to the status data received from the ICS; and
      deleting status data received from the suspect ICS after checkpoint creation;
   in response to receiving, by the ICS from the anomaly analyzer, an indication that the ICS is operating anomalously, the ICS halting operation; and
   the ICS further operated to receive and process status data from the one or more other ICSs, to analyze the status data received from the one or more other ICSs, and notify the anomaly analyzer if one or more of the other ICSs is suspected of having an anomaly.

2. A method in accordance with claim 1, further comprising:
   in response to receiving from the anomaly analyzer an indication that the ICS is operating anomalously, the ICS performing one or more actions in accordance to a security policy.

3. A method in accordance with claim 1, wherein storing the status data as normal pattern data is performed in accordance with a security policy, based on one or more of raw data, aggregate data, and statistical data recorded in the pattern data.

4. A method in accordance with claim 1, wherein transmitting the alternate status data is performed in accordance with status data generation rules, based on one or more of raw data, aggregate data, statistical data recorded in the pattern data, sending simulated real time data, sending real status data, and sending no data.

* * * * *